United States Patent [19]

Murata et al.

[11] Patent Number: 5,735,743
[45] Date of Patent: Apr. 7, 1998

[54] GAME MACHINE HAVING PLAY-BY-PLAY ANNOUNCEMENT

[75] Inventors: Shiro Murata; Koji Toyohara; Naoki Nishikawa, all of Kobe; Masahiro Ikariko, Kadoma; Kazuhiko Uehara, Kobe; Hideto Inoue, Akashi, all of Japan

[73] Assignee: Konami Co., Ltd., Hyogo-ken, Japan

[21] Appl. No.: 353,873

[22] Filed: Dec. 12, 1994

[30] Foreign Application Priority Data

Dec. 14, 1993 [JP] Japan .................... 5-313705

[51] Int. Cl.⁶ .................................................. A63F 9/00
[52] U.S. Cl. .................. 463/35; 463/30; 463/36; 463/4
[58] Field of Search .................. 463/1–4, 7–8, 463/30–31, 34, 35–36, 43; 434/247–252, 257, 307 R, 365, 392; 364/410; 395/484, 485, 405, 454

[56] References Cited

U.S. PATENT DOCUMENTS

| | | | |
|---|---|---|---|
| 4,395,760 | 7/1983 | Soski et al. | 463/3 |
| 4,422,639 | 12/1983 | Del Principe et al. | 463/4 |
| 4,582,323 | 4/1986 | Minkoff et al. | 463/4 |
| 4,662,635 | 5/1987 | Enokian | 463/4 |
| 4,672,541 | 6/1987 | Bromley et al. | 463/31 |
| 4,695,953 | 9/1987 | Blair et al. | 463/7 |
| 5,026,058 | 6/1991 | Bromley | 463/3 |
| 5,067,079 | 11/1991 | Smith, III et al. | 463/35 |
| 5,462,275 | 10/1995 | Lowe et al. | 463/35 |

FOREIGN PATENT DOCUMENTS

| | | |
|---|---|---|
| SHO 59-232568 | 12/1984 | Japan . |
| 2163929 | 3/1986 | United Kingdom . |

OTHER PUBLICATIONS

WO–A–86 02753 (Videodrome Ltd) 9 May 1986.
J.M. Preston 'Compact Disc–Interactive; A Designer's Overview' 1987, Kluwer Technical Books, Deventer, The Netherlands.

*Primary Examiner*—Jessica Harrison
*Assistant Examiner*—Mark A. Sager
*Attorney, Agent, or Firm*—Jordan and Hamburg

[57] ABSTRACT

A game machine having play-by-play announcement includes a monitor, a manipulator, a memory to store data for each of a plurality of vocal sound groups, each vocal sound group expressing a word in connection with the game; a controller operable to produce a new game scene on the monitor in accordance with a game program and an instructive signal generated by the manipulator, and designate data for a vocal sound group suitable to the produced new scene; and a sound generator to generate vocal sounds suitable for the new scene based on the designated data.

11 Claims, 4 Drawing Sheets

GAME MACHINE HAVING PLAY-BY-PLAY ANNOUNCEMENT

BACKGROUND OF THE INVENTION

This invention relates to a game machine provided with a number of operating members for giving an operational command to a character displayed on a monitor and a controller for receiving the operational command to control the development of game in accordance with a given game program.

In conventional television game machines, there has been known a technology of generating the sound of footsteps, i.e. sound effects in connection with the movement of a character displayed on a monitor. Japanese Unexamined Utility Model Publication No. SHO 55-56686 and Japanese Unexamined Utility Model Publication No. SHO 55-72994 respectively disclose a baseball game machine and a golf game machine accompanied with play-by-play announcement sound.

More specifically, such a game machine is associated with a sound record sheet which is inserted into a loading section of the game machine to generate prepared sound for play-by-play announcement in accordance with the development of game, thereby providing a realistic impression.

The conventional sound effects, typically represented by the above-mentioned footsteps associated with the movement of character, is chiefly characterized in that a sounding time is short because of its simple sound nature, processing is based on easy repetition of the same sound, and the sound effects are applied to particular operations only. Thus, such conventional sound effects will encounter with a difficulty of creating consecutive sounds constituting a meaningful sentence. Since such delicate sound effects require too much data, development of game will be generally obstructed by processing such sound effect if executed based on the conventional technology.

It has been also impossible to accept a complicated judgment in accordance with the development of game which is mandatorily required in the play-by-play announcement. For example, according to the conventional baseball game machine or golf game machine, development of game is solely determined by reproduction of announcement optionally selected from the sound record sheet. In other words, it has been impossible to execute a sophisticated play-by-play announcement in response to each scene of the game, i.e., each operation of the game.

SUMMARY OF THE INVENTION

It is an object of the present invention to provide a game machine which has overcome the above problems residing in the prior art.

It is another object of the present invention to provide a game machine which can execute play-by-play announcement without hindering game development to provide a realistic atmosphere.

Accordingly, a game machine of the present invention comprises: a monitor on which a game scene is displayed; a manipulator operable to generate an instructive signal in accordance with an operation of a player; a storage portion operable to store data for each of a plurality of vocal sound groups, each vocal sound group expressing a word in connection with the game; a controller operable to produce a new game scene on the monitor in accordance with a game program installed therein and an instructive signal generated by the manipulator, and designate data for a vocal sound group suitable to the produced new scene; and a sound generator operable to generate vocal sounds suitable for the new scene based on the designated data.

The sound generator may be constructed by a converter operable to convert the designated data to vocal sounds at a rate which holds the frequency of the vocal sound data within an audible band; and a data transfer operable to transfer the designated data to the converter at a rate faster than the rate of conversion in the converter.

It may be preferable to divide the data into a plurality of data parts, and transfer the plurality of data parts one after another at a predetermined interval to the converter. Also, it may be appreciated to assign each data part with a specified address to render the controller designate data by use of an address. Further, the storage portion may be provided with a data region storing data parts in accordance with their respective addresses and a reference region storing the head address of each vocal sound group data and the number of data parts to render the controller designate data by specifying the head address and the number of data parts.

It may be preferable that the transfer of a data part is executed by temporarily interrupting the production of a new scene. Further, the controller may be provided with a timer operable to provide an interrupting time.

With the above-mentioned game machine, there is provided the storage portion operable to store data of a plurality of vocal sound groups and the controller operable to produce a new game scene on the monitor in accordance with a game program and an instructive signal generated by the manipulator. Further, the controller is operable to designate data of a vocal sound group suitable to the produced new scene which vocal sounds suitable for the new scene is in turn generated based on. This makes it possible to generate vocal sounds suitable for game developments, which consequently providing an improved realistic atmosphere.

The data transfer is executed from the storage portion to the converter faster than the rate at which the designated data is converted to vocal sound. Accordingly, vocal sounds are generated without the likelihood of giving the player an awkward delay.

The data is divided into a plurality of data parts, and the plurality of data parts are transferred one after another at a predetermined interval to the converter. This makes it possible to reduce time of each data transfer according to needs. Accordingly, the data transfer will give little influence to the processing of the controller to produce game scenes.

Each data part is assigned with a specified address. The storage portion mainly consists of the data region and the reference region. Accordingly, the designation of a suitable vocal sound group will be executed with ease.

The transfer of a data part is executed by temporarily interrupting the production of a new scene. The controller may be provided with a timer operable to provide an interrupting time. Accordingly, vocal sounds relative to a new scene will be generated simultaneously with the production of the new scene.

The above and other objects, features and advantages of the present invention will become more apparent from the following detailed description which is to be read in conjunction with the accompanying drawings.

DETAILED DESCRIPTION OF THE PREFERRED EMBODIMENT OF THE INVENTION

Figure 1:
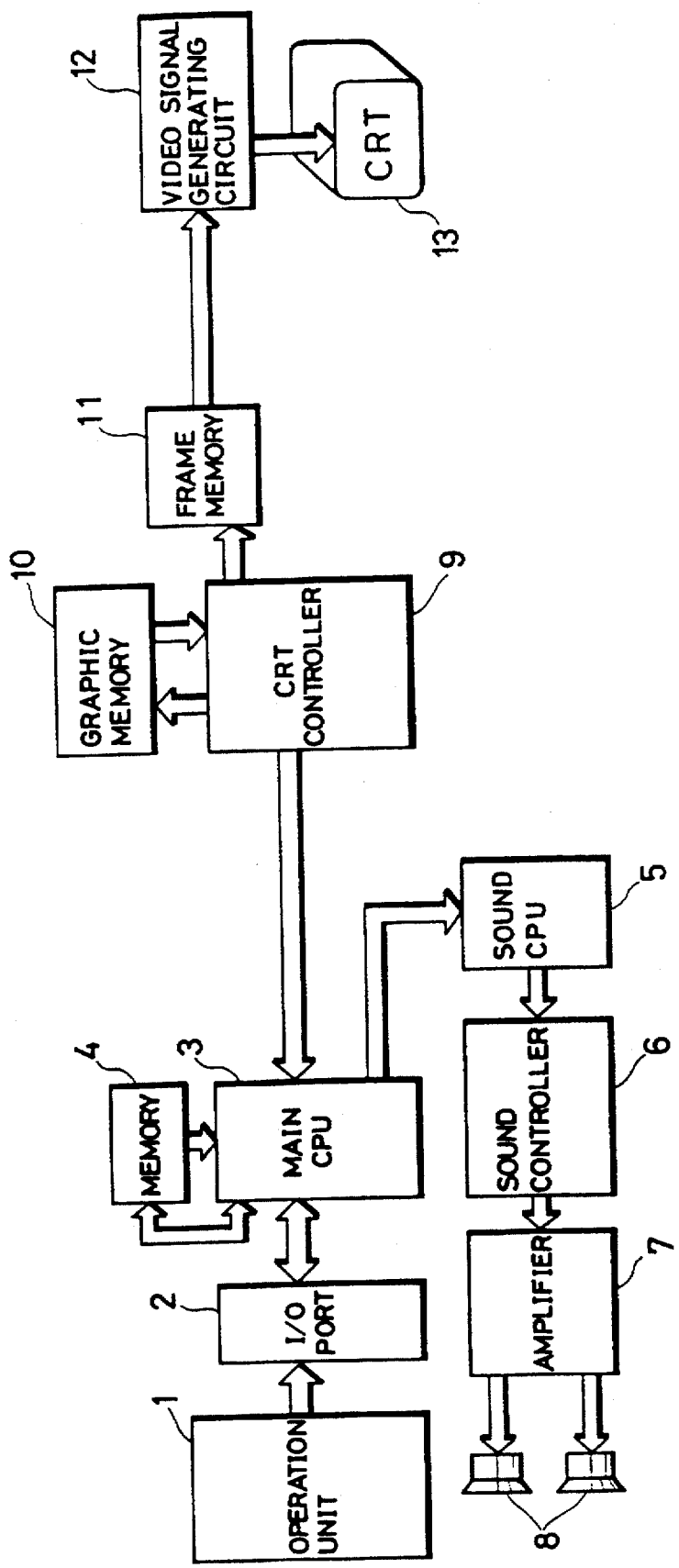
FIG. 1 is a block diagram showing an arrangement of a control system of a game machine having a play-by-play announcement function in accordance with the present invention.

A preferred embodiment of the present invention will be described in detail with reference to the accompanying drawings. FIG. 1 is a block diagram showing a principal arrangement of a game machine of the present invention.

A reference numeral 1 represents an operation unit including a manipulating lever, switches, and buttons. Operative contents of the operation unit 1 is sent via an I/O port 2 to a main CPU 3. The manipulating lever of the operation unit 1 gives a command relating to a moving direction of the character. The switches and buttons enable the character to cause a predetermined motion, such as a pitching motion, a throwing motion, and a bat swing in a baseball game, at a predetermined timing. Furthermore, this kind of game machine has a team creating function of allowing a game player to flexibly select his/her favorite team and baseball players using the operation unit 1.

The main CPU 3 executes an overall control of the operations of the game machine, and has a ROM 31 for storing a game program and a RAM 32 for temporarily storing processing data. The ROM 31 can be omitted if the game program is stored in a game cassette detachably inserted in a cassette loading section of the game machine.

A vocal sound data storage portion 4 stores various data of groups of vocal sounds required for play-by-play announcement in association with development of game and an instructive signal generated by the operation unit 1, which will be described in detail later. For example, a baseball game contains a total of four scenes, i.e., a batting scene, a fielding scene, a changing-over scene and a game set scene. A predetermined number of vocal sound groups are assigned to each of four scenes for play-by-play announcement in accordance with the development of game and manipulation of the operation unit 1.

In the batting scene, for example, there are the following groups of vocal sounds: "BREAKING BALL", "STRAIGHT BALL", "CHANGE-UP", "STRIKE", "BALL", "WITHOUT RUNNERS", "WITH A RUNNER AT FIRST BASE", "BATTER OUT", "OUT AT FIRST BASE", "CHANGE-OVER", "TEAM NAME. "BATTING ORDER", "FIELDING POSITION", "PLAYER'S NAME", "UNIFORM NUMBER". etc. Using these vocal sound groups, a play-by-play announcement, for example, goes like "BREAKING BALL, STRIKE", "FIRST BATTER, CENTER, SMITH, NUMBER 5", "STRIKE, BATTER OUT, THREE MEN OUT", or the like, as described later.

In the fielding scene, for example, there are the following groups of vocal sounds: "HIT!", "HIT A BALL", "CATCH A BALL", "THROW A BALL TO FIRST BASE", "RETURN THE BALL TO HOME BASE", "THIS IS BIG", "HIT A FENCE DIRECTLY", "HOME RUN", "SINGLE", "DOUBLE", "TWO-RUN HOME RUN", "PASSED", "NICE PLAY!", "SCORING A FIRST POINT", "FOUL BALL", etc. Using these vocal sound groups, announcement, for example, goes like "HIT!, THIS IS BIG, HOME RUN, SCORING A FIRST POINT", "CATCH A BALL, NICE PLAY, RETURN THE BALL TO HOME BASE, RUNNER OUT" or the like.

In the changing-over scene, for example, there are such vocal sound groups as: "INNING", "BOTTOM", "TOP", "ENDING", "TEAM NAME", "END SCORELESS", "GO INTO REVERSE", etc.

In the game set scene, for example, there are such vocal sound groups as: "AS YOU SEE, TODAY'S GAME ENDED", "WITH A VICTORY OF", "TEAM NAME", etc.

The reason why a plurality of groups of vocal sounds having the same meaning, such as "HIT!" and "HIT A BALL", are prepared for the same scene is to express a delicate nuance of each vocal sounds by taking account of circumstances. For example, the former vocal sound group "HIT!" is exclusively used for a scene that there is a possibility of getting a score or turning the tide in the game while the latter vocal sound group "HIT A BALL" is solely used for other circumstances. Similarly, it may be preferable to prepare a plurality of groups of vocal sounds having the same word but different intonations, and select a proper vocal sound group according to a circumference.

The main CPU 3 successively designates an appropriate vocal sound group to be used in the play-by-play announcement in accordance with the development of game and a operational command given from the operation unit 1. The designated vocal sound group, after being applied the pulse code modulation (PCM) and a predetermined data compression processing, is transferred to a later-described sound CPU 5.

The sound CPU 5 temporarily stores vocal sound group data for play-by-play announcement which has been transferred from the main CPU 3. The vocal sound data, after being applied a demodulation and an expansion processing, are read out at a predetermined rate which holds the frequency of the vocal sound data within an audible band. A sound controller 6 converts vocal sound data into an analog sound waveform signal which is output from a number of loud speakers 8 through an amplifier 7.

A CRT controller 9 accesses a graphic memory 10 to supply a frame memory 11 with necessary image signals and characters in response to control signals supplied from the main CPU 3. The frame memory 11 stores the image signals and characters read out from the graphic memory 10. A video signal generating circuit 12 converts the image signals and others stored in the frame memory 11 into video signals, and periodically supplies these video signals to a monitor 13 at a high speed.

The monitor 13, such as CRT or LCD, provides a scene image on a screen thereof in accordance with the received video signals.

Figure 2:
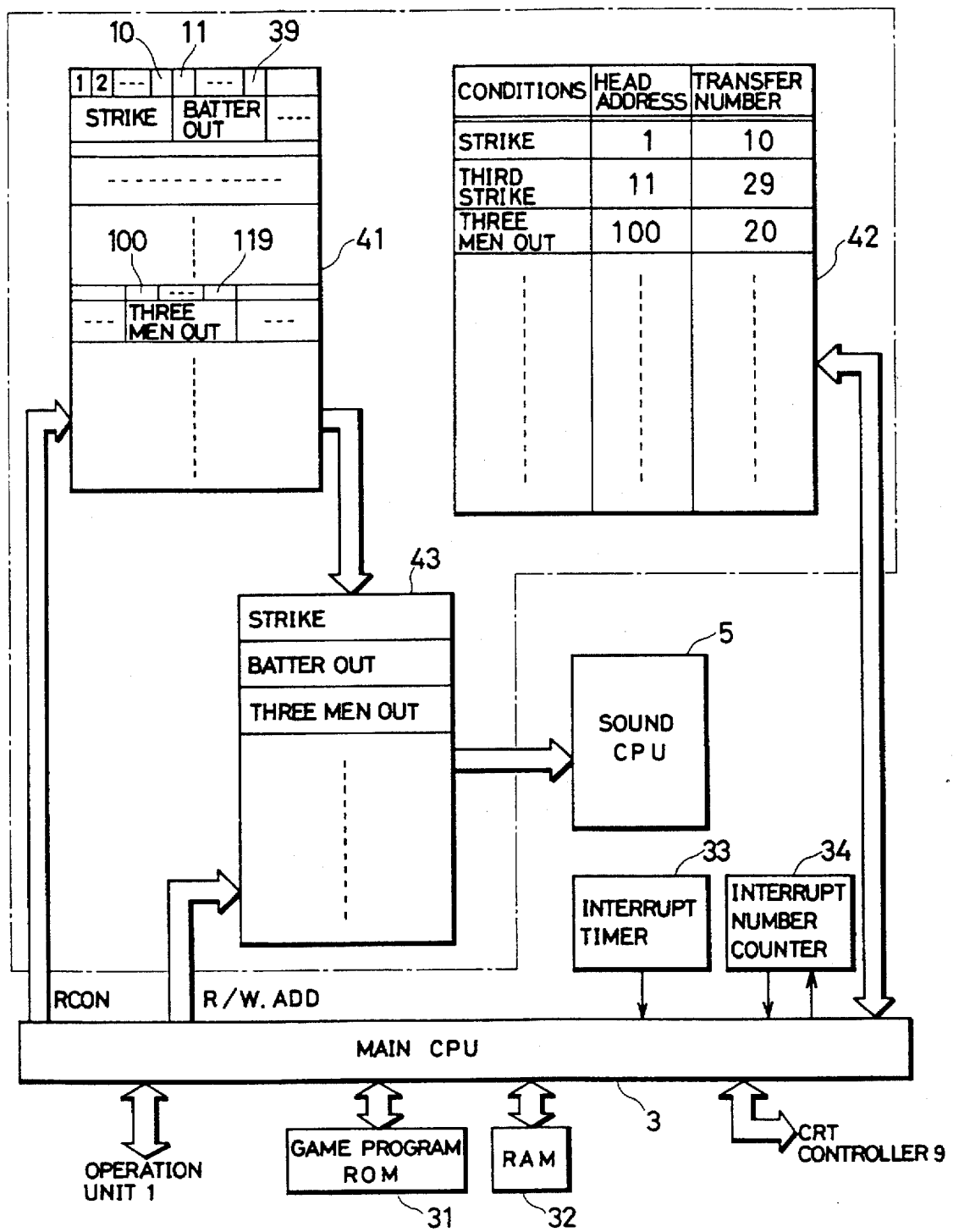
FIG. 2 is a diagram showing details of a vocal sound data storage portion and its peripheral devices of the control system.

FIG. 2 is a diagram showing details of the vocal sound data storage portion 4 and its peripheral devices. The vocal sound data storage portion 4 includes three storage regions: a vocal sound data region 41, a reference region 42 and an arranging region 43.

The vocal sound data region 41 includes a ROM having a predetermined storage capacity, and stores data of groups of vocal sounds for play-by-play announcement. The vocal sound data is a series of digital signals representing a voice waveform. Each vocal sound group data is divided into a specified number of data parts. Each data part is assigned with a specified address. For example, addresses 1–10 are assigned to the vocal sound group "STRIKE", addresses 11–39 are assigned to the vocal sound group "BATTER OUT", and addresses 100–119 are assigned to the vocal sound group "THREE MEN OUT".

The reference region 42 includes a ROM having a predetermined storage capacity, and stores the head address and the number of data parts of each vocal sound group data. Each vocal sound group data are partially sent each data part to the sound CPU 5. Accordingly, the number of data parts is identical to the number of partial data transfers for each vocal sound group. For example, the vocal sound group "STRIKE" is divided into ten data parts. Accordingly, the vocal sound group "STRIKE" is completely transferred in ten partial data transfers. However, it should be noted that the number of partial data transfers is not required to be equal to the number of data parts, but each vocal sound group data may be transferred smaller times than the number of data parts. In this embodiment, the data amount which is to be transferred in one partial data transfer is 80 H (substantially equivalent to 128 bytes).

Vocal sound groups are determined in accordance with the development of game and an instructive signal generated by manipulation of the operation unit 1. For example, in the case of a pitched ball being a strike, the main CPU 3 designates the vocal sound group "STRIKE" whose head address is 1 and partial transfer number is 10. Further, if this "STRIKE" is a third strike, the main CPU 3 also designates the vocal sound group "BATTER OUT" whose head address is 11 and partial transfer number is 29. Furthermore, if three men are out in this instance, the CPU 3 also designates the vocal sound group "THREE MEN OUT" whose head address is 100 and partial transfer number is 20.

The arranging region 43 includes an RAM, and stores data of the designated vocal sound groups, i.e., "STRIKE", "BATTER OUT", and "THREE MEN OUT", in the order of designations of the main CPU 3. The main CPU 3 partially transfers these vocal sound group data to the sound CPU 5 in the order of designation.

A resettable interrupting timer 33 sets an interrupting time to partially transfer vocal sound data, for example, at an interval of 1/60 second. More specifically, the main CPU 3 assigns, for example, 10% of each 1/60 second to the partial transfer of vocal sound data and assigns the remaining 90% of 1/60 second to the game processing.

This partial transfer of vocal sound data is advantageous in eliminating the problem that the development of game, i.e., game program, is undesirably interrupted for a significant long time for transferring vocal sound data at a time. Accordingly, the game scene quickly responds to manipulation of the operation unit 1. An interrupting number counter 34 is adapted for counting the number of interruptions or partial transfers.

Figure 3:
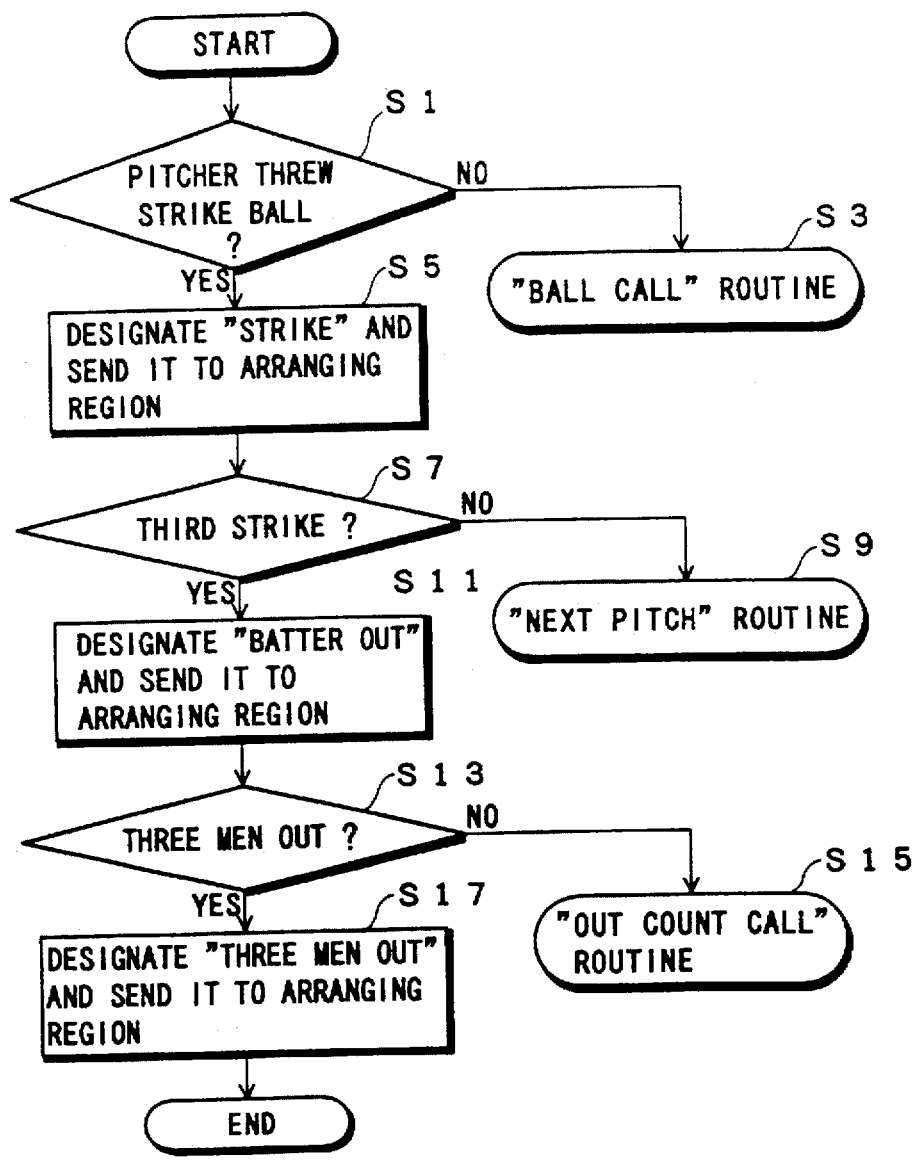
FIG. 3 is a flowchart showing an operation of designating vocal sound groups under a batting scene of a baseball game executed in the game machine.

FIG. 3 is a flowchart showing an operation of designating of vocal sound groups under a batting scene in a baseball game wherein a ball pitched by a pitcher is about to be judged.

First of all, it is judged whether or not the pitcher has thrown a strike ball (Step S1). If the judgment is "NO" (i.e. the pitcher has not thrown a strike ball) in Step S1, the CPU 3 proceeds to Step S3 in which a "BALL CALL" routine is executed. On the contrary, if the judgment is "YES" in Step S1, the CPU 3 proceeds to Step S5 in which the vocal sound group "STRIKE" is designated by specifying the head address and the number of partial transfers (1, 10) of the reference region 42, and the "STRIKE" vocal sound data is sent from the vocal sound data region 41 to the arranging region 43.

Next, in the event that the pitched ball is strike, it is further judged in Step S7 whether or not this is a third strike. If the judgment is "NO" in Step S7, the CPU 3 proceeds to Step S9 in which a "NEXT PITCH" routine is executed. On the contrary, if the judgment is "YES" in Step S7, the CPU 3 proceeds to Step S11 in which the vocal sound group "BATTER OUT" is designated by specifying the head address of the partial transfer number (11, 29) of the reference region 42, and the "BATTER OUT" vocal sound data is sent from the vocal sound data region 41 to the arranging region 43.

Subsequently, in the event that a batter is out, it is judged in Step S13 whether or not three men are out. If the judgment is "NO" in Step S13, the CPU 3 proceeds to Step S15 in which a "OUT COUNT CALL" routine is executed. In the "OUT COUNT CALL", "ONE MAN OUT" or "TWO MEN OUT" vocal sound data is sent from the vocal sound data region 41 to the arranging region 43. On the contrary, if the judgment is "YES", i.e., three men are judged to be out, in Step S13, the CPU 3 proceeds to Step S17 in which the vocal sound group "THREE MEN OUT" is designated by specifying the head address of the partial transfer number (100, 200) of the reference region 42, and the "THREE MEN OUT" vocal sound data is sent from the vocal sound data region 41 to the arranging region 43.

It is to be noted that upon start of the game routine, the interrupting timer 33 starts and the interrupting number counter 34 is reset to "1".

Figure 4:
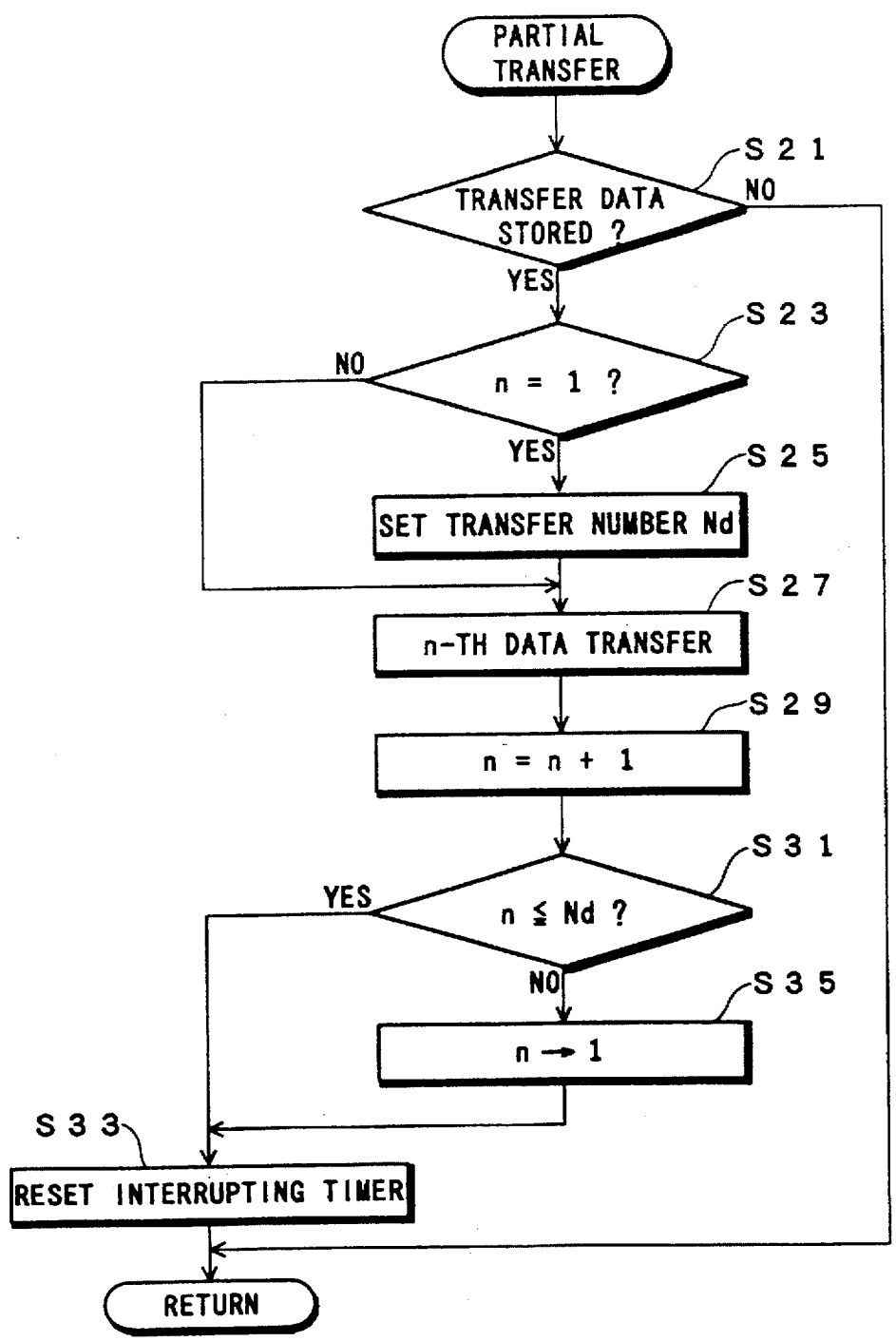
FIG. 4 is a flowchart showing an operation of transferring vocal sound data partially while interrupting processing for game development.

FIG. 4 is a flowchart showing an operation of transferring a partial data of a designated vocal sound group to the sound CPU 5. The CPU 3 enters this partial transferring operation in response to an elapse of 1/60 second measured by the interrupting timer 33.

In this routine, first of all, it is judged in Step S21 whether or not the arranging region 43 stores vocal sound data for transfer. If the judgment is "YES" in Step S21, it is further judged in Step S23 whether or not the present transfer is an initial partial data transfer for a given vocal sound group, i.e., the partial data transfer number is first (n=1).

If the judgment is "YES" (n=1) in Step S23, the CPU 3 proceeds to Step S25 in which partial data transfer number (Nd) necessary for the given vocal sound group is set based on the data stored in the reference region 42. Subsequently, the CPU 3 proceeds to Step S27. On the contrary, if the judgment is "NO" in Step S23, the CPU 3 skips Step S25 and directly proceeds to Step S25 because the present transfer is in the process of transferring data for the given vocal sound group.

In Step S27, the n-th partial data is transferred from the arranging region 43 to the sound CPU 5. After finishing the n-th partial data transfer, the partial data transfer number "n", i.e., the count number of the interrupting number counter 34, is incremented by 1 in Step S29.

Next, it is judged in Step S31 whether or not the incremented transfer number "n" is smaller than or equals to the set transfer number Nd. If the judgment is "YES" in Step S31, i.e., the present transfer is in the process of transferring partial data for the given vocal sound, the CPU 3 proceeds to Step S33 to reset the interrupting timer 33 and then return to a main routine.

On the contrary, if the judgment is "NO" in Step S31, i.e., the present transfer completes the transfer of data for the given vocal sound group, the CPU 3 proceeds to Step S35 to reset the present partial data transfer number "n" to "1" and then proceeds to Step S33.

If the judgment is "NO" in Step S21, i.e., no transfer data is stored in the arranging region 43, the CPU 3 ends this partial data transfer routine.

The loud speakers 8 generate a vocal sound in accordance with a sound signal from the sound CPU 5 for a period which is longer than the period of transferring a partial data. Therefore, utilizing this difference between the sound generation period and the partial data transfer period, it is possible to transfer a next partial data before the loud speakers 8 terminate the generation of sound based on the previous partial data. Accordingly, even if a number of vocal sound groups are successively supplied, these vocal sounds can be surely generated by the loud speakers 8 without giving the game player any awkward delay.

In this embodiment, one partial data is transferred every 1/60 second. However, it is not necessary to set a fixed transfer period. As far as the partial data transfer is executed sufficiently fast compared with the sound generation period of the loud speakers 8, the partial data transfer period may be changed depending on the processing content of the main CPU 3. For example, when the main CPU 3 is not required to assign a long period for processing of game development, it may be possible to transfer a mass of an appropriate number of partial data or all the partial data for a given sound group.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A game machine comprising:
   a monitor on which a game scene is displayed;
   a manipulator for generating an instructive signal in response to operation of the manipulator by a player;
   a storage means for storing a data set for each of a plurality of vocal sound groups and each of said data sets is subdivided into a plurality of data subsets;
   a controller means for producing successive game scenes on the monitor at predetermined intervals corresponding to a refresh rate of said monitor in accordance with a game program installed therein and said instructive signal generated by the manipulator, and for designating at least one of said data sets corresponding to one of said vocal sound groups associated with a selected series of said successive game scenes;
   a converter means for converting said at least one of said data sets at a rate for producing an audio signal; and
   said controller means including a data transfer means for transferring to said converter means said plurality of data subsets of said at least one of said data sets successively in subset groups, formed of at least one of said data subsets, per one of said predetermined intervals during a predetermined portion of said predetermined intervals wherein individual ones of said subset groups are converted to an audio signal of longer duration than each of said predetermined intervals until all data of said at least one of said data sets is transferred to said converter means and wherein a remaining portion of said predetermined intervals is sufficient for said controller to produce one of said successive games scenes.

2. A game machine as defined in claim 1, wherein the transfer of said data subsets is executed by temporarily interrupting the production of said one of said successive game scenes.

3. A game machine as defined in claim 2, wherein the controller includes a timer for generating an interrupt in synchronism with said predetermined intervals.

4. A game machine as defined in claim 1, wherein each of said data subsets is assigned a specified address, and the controller means designates data by use of an address.

5. A game machine as defined in claim 4, wherein the storage means includes:
   a data region storing the data subsets in accordance with respective addresses of the data subsets;
   a reference region storing a head address of each of said data sets of each of said vocal sound groups and an associated number of said data subsets in each of said data sets; and
   the controller means including means for designating one of said data sets by specifying the head address and the number of data subsets associated with said one of said data sets.

6. An apparatus for displaying an event by driving a video display at a predetermined refresh rate and simultaneously driving a speaker with an audio signal corresponding to scenes on said video display, the event being displayed by a stored program, the apparatus comprising:
   a input device for a user to input control signals;
   means for accepting a program memory having said stored program for said displaying of said event in response to said control signals;
   said stored program including an audio memory containing audio segments stored as digital audio data sets divided into audio data subsets wherein said audio data subsets include audio data sufficient to reproduce audio sound longer in duration than a refresh period determined by said predetermined refresh rate;
   a controller means for producing successive video scenes for driving said video display in accordance with said stored program and said control signals, each of said video scenes being produced during a portion of said refresh period of said predetermined refresh rate;
   an audio generator for converting said digital audio data sets into an analog audio signal for driving said speaker; and
   said controller means further including means for selecting one of said audio segments corresponding to a series of video scenes and transferring at least one audio data subset during a remaining portion of said refresh period of said predetermined refresh rate to said audio generator for successive ones of said refresh periods until all of said audio data subsets of said one of said audio segments is transferred to said audio generator for conversion to said analog audio signal by said audio generator.

7. The apparatus of claim 6 wherein said audio memory further includes a look-up table including head addresses of said digital audio data sets for said audio segments and corresponding numbers of said audio data subsets associated with respective ones of said audio segments.

8. The apparatus of claim 6 wherein said audio memory further includes a memory means for storing successively selected digital audio data sets for transfer to said generator means.

9. The apparatus according to claim 6 further including said speaker.

10. The apparatus according to claim 6 further including said program memory.

11. The apparatus according to claim 6 further including said video display.

* * * * *